Dec. 31, 1940. S. H. BENJAMIN 2,226,963
BLADE EJECTOR MAGAZINE
Filed Aug. 10, 1940  4 Sheets-Sheet 1

INVENTOR.
Sidney H. Benjamin
BY Howard Freeman
his ATTORNEY.

Dec. 31, 1940.        S. H. BENJAMIN          2,226,963
BLADE EJECTOR MAGAZINE
Filed Aug. 10, 1940       4 Sheets-Sheet 2

INVENTOR.
Sidney H. Benjamin
BY
ATTORNEY.

Dec. 31, 1940. S. H. BENJAMIN 2,226,963
BLADE EJECTOR MAGAZINE
Filed Aug. 10, 1940 4 Sheets-Sheet 3

INVENTOR.
Sidney H. Benjamin
BY Howard Freeman
his ATTORNEY.

Dec. 31, 1940. S. H. BENJAMIN 2,226,963
BLADE EJECTOR MAGAZINE
Filed Aug. 10, 1940 4 Sheets-Sheet 4
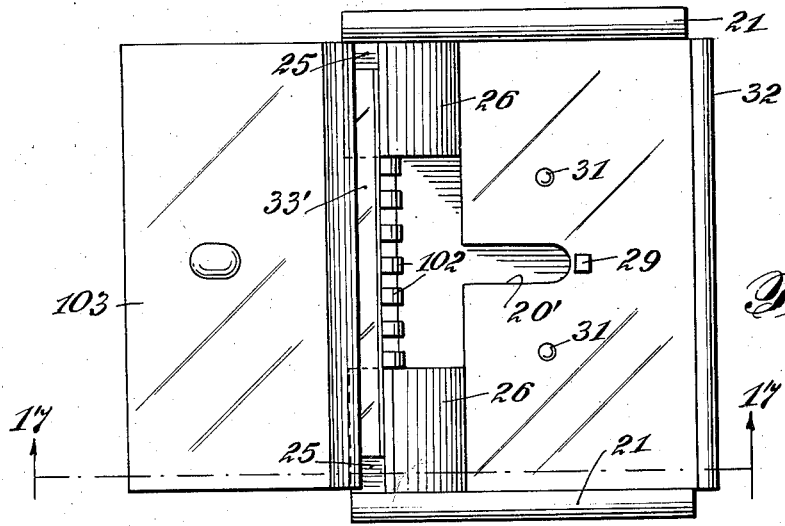
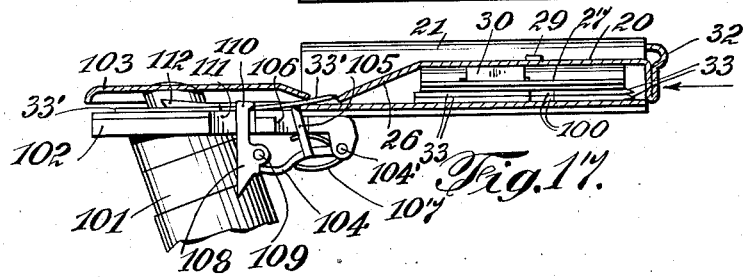
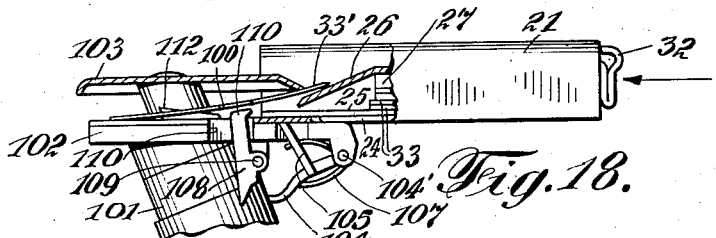
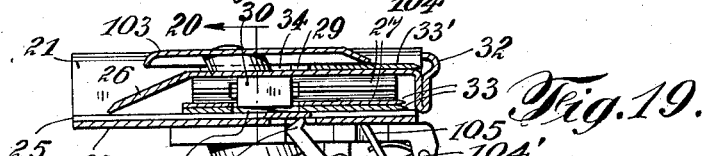
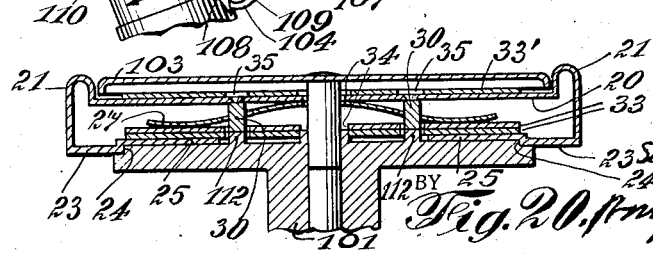
INVENTOR.
Sidney H. Benjamin
BY
ATTORNEY.

Patented Dec. 31, 1940

2,226,963

UNITED STATES PATENT OFFICE 2,226,963

BLADE EJECTOR MAGAZINE

Sidney H. Benjamin, Milwaukee, Wis.

Application August 10, 1940, Serial No. 352,065

12 Claims. (Cl. 30—40)

My invention relates to improvements in razor blade magazines and refers particularly to safety razor blade magazines adapted to hold a plurality of stacked blades and of such construction that they will insert and deposit a new blade in a razor and will withdraw a used blade therefrom by the simple reciprocal movement of the magazine over and upon the guard member thereof.

This application is a continuance-in-part of my patent application for "Safety razors," filed July 27, 1940, Serial Number 347,838.

One object of my invention is a blade ejector magazine of such construction that a movement thereof over and upon the guard member of a razor will release a used blade from contact with said guard member and will deposit a new blade thereon.

Another object of my invention is a blade ejector magazine of such construction that a reverse movement thereof over and upon the guard member of a razor, will allow the retention of a new blade upon said guard and will withdraw a used blade from said razor.

Another object of my invention is a blade ejector magazine of such construction that during the withdrawal of a blade therefrom, the edges of said blade will not contact said magazine.

Another object of my invention is a blade ejector magazine capable of holding a plurality of stacked blades and from which only one blade can be withdrawn and deposited upon the guard member of a razor during a single movement of said device over and upon said guard.

Another object of my invention is a blade ejector magazine of such construction as to allow of the withdrawal of one blade therefrom and its deposit upon the guard member of a razor without contact of said blades with the fingers of the operator.

It is evident that the blade ejector magazines of my invention possessing the above-mentioned attributes, and many others which will be evident upon a consideration of my disclosures and descriptions herein, have many important and valuable properties over those operations in which it is necessary to remove used blades and deposit new blades upon razors by contact between the blades and the fingers of the operators and for the further reason that my blade ejector magazine is adapted to remove a used blade from and to deposit a new blade in those razors in which a blade can not be removed without the application of devices especially adapted for that purpose.

In the accompanying drawings illustrating modified forms of devices of my invention, similar parts are designated by similar numerals.

Figure 16 is a top plan view of the device of Figure 11 partially inserted in a razor.

Figure 17 is a section through the line 17—17 of Figure 16.

Figure 18 is a view similar to that of Figure 17 with the magazine further inserted.

Figure 19 is a view similar to that of Figure 17 with the magazine fully inserted.

Figure 20 is a section through the line 20—20 of Figure 19.

Figure 1:
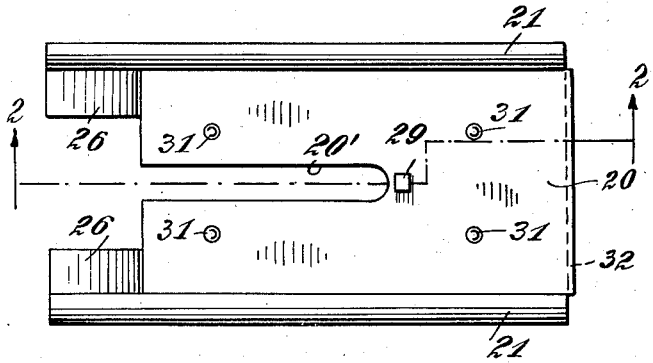
Figure 1 is a top plan view of one form of a device of my invention.
Figure 2:
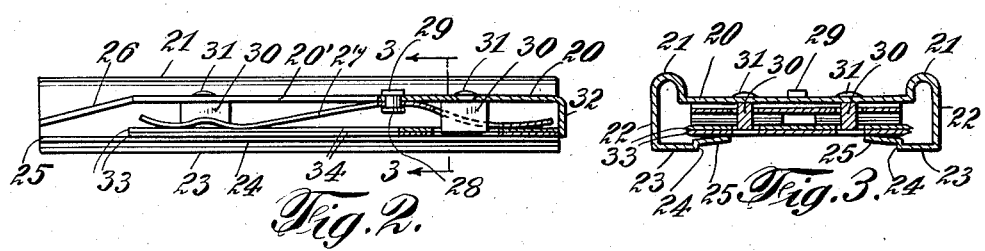
Figure 2 is a section through the line 2—2 of Figure 1.
Figure 3:
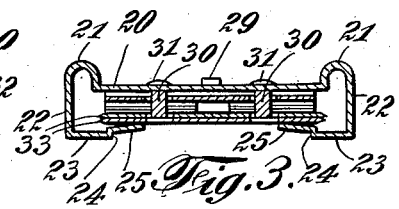
Figure 3 is a section through the line 3—3 of Figure 2.
Figure 4:
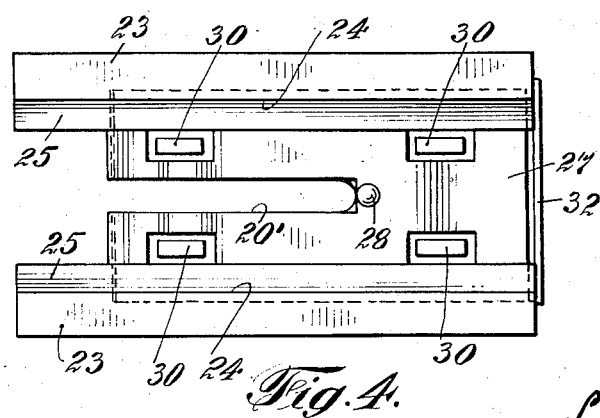
Figure 4 is a bottom view of the device of Figure 1 with the blades removed.

The particular form of a device of my invention shown in Figures 1 to 4 comprises an elongated container having the top plate 20 which is extended upwardly and thence downwardly forming the curved longitudinal edges 21, 21, thence downwardly forming the sides 22, 22, thence inwardly forming the bottom 23, 23, thence upwardly and upwardly inclined inwardly forming the two shoulders 24, 24 and the two spaced blade guide members 25, 25.

The top plate 20 is extended into the two downwardly inclined spaced blade guides 26, 26, the extremities of which are spaced from the extremities 25, 25 of the bottom sufficiently to allow of the passage of a blade therethrough.

The top plate 20 has the elongated recess 20' and a leaf spring 27 is affixed to the top 20 by means of the rivet 28 which is also extended above the top 20 to form the blade withdrawing lug, or catch 29.

A plurality of blade retaining lugs 30, 30, extend downwardly from the top 20 and are affixed thereto by the rivets 31, 31. These lugs 30, 30 are positioned to enter openings in a plurality of blades within the device and are of such length as to pass through all of the blades with the exception of the bottom one, thus allowing the bottom blade to pass outwardly through the opening between the inclined members 25 and 26 while retaining the rest of the blades within the device.

The rearward end of the device has the closure 32.

Figure 5:
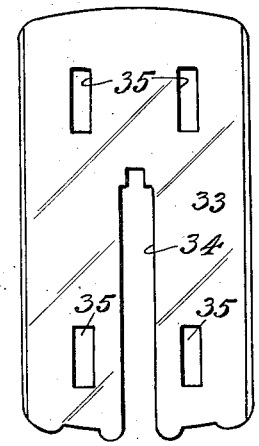
Figure 5 is a plan view of a blade adapted for use with the device of Figure 1.

Figure 5 illustrates a blade 33 adapted for the shown blade ejecting magazine, having a recess 34 and a plurality of openings 35, 35 to receive the lugs 30, 30, but blades of other construction can be employed to meet the requirements of changed construction of the magazine.

In the drawings, I show two blades 33, 33 within the device but it is to be understood that any desired number may be included therein.

The blade ejector magazine above described may be employed for the insertion of a new blade and the withdrawal of a used one with any razor of such mechanical construction as to be operated by my device as shown and described, I show in Figures 6 to 10 one form of a razor adapted for this purpose, but I do not limit myself to this particular form of a razor.

Figure 6:
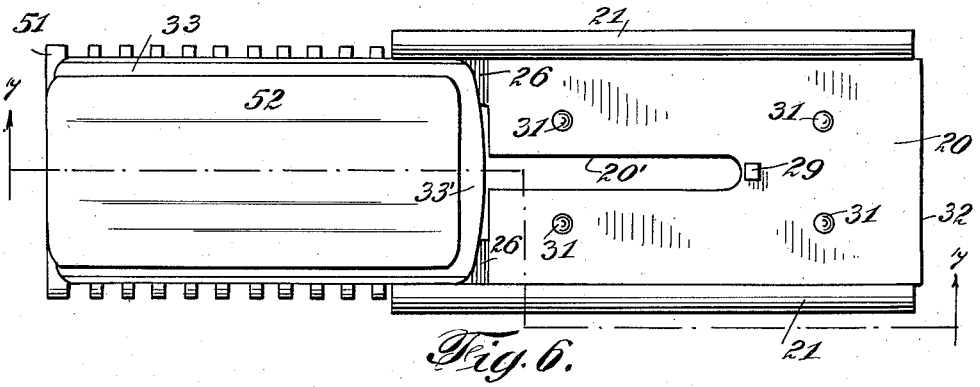
Figure 6 is a top plan view of the device of Figure 1 partially inserted in a razor.
Figure 7:
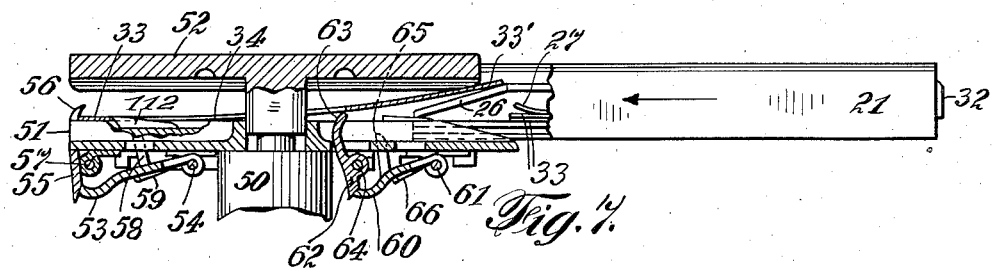
Figure 7 is a section through the line 7—7 of Figure 6.
Figure 8:
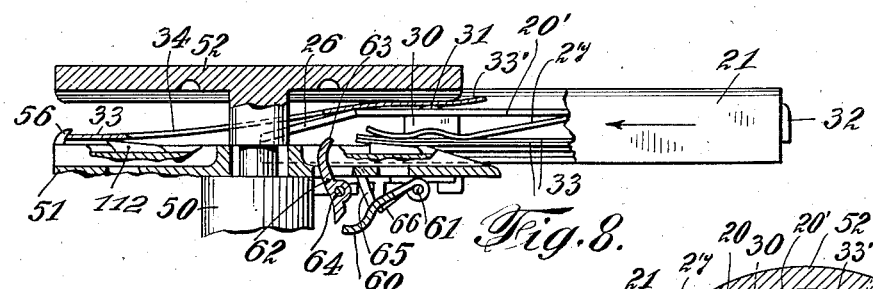
Figure 8 is a view similar to that of Figure 7 with the magazine further inserted.
Figures 9, 10:
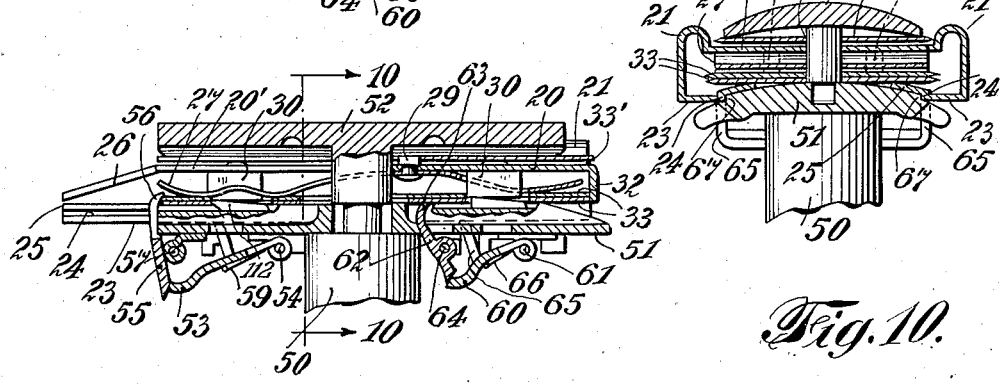
Figure 9 is a view similar to that of Figure 7 with the magazine fully inserted.
Figure 10 is a section through the line 10—10 of Figure 9.
Figure 11:
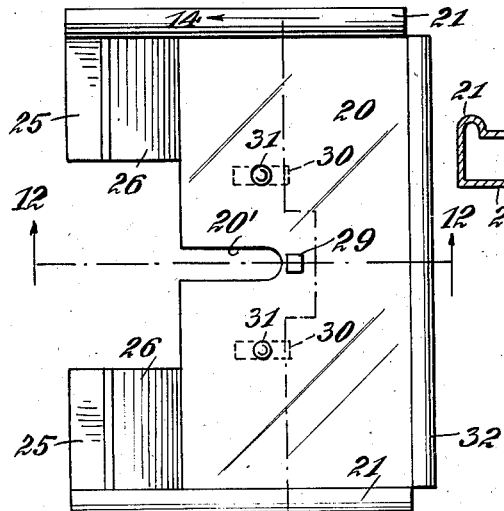
Figure 11 is a top plan view of a modified form of a device of my invention.
Figure 14:
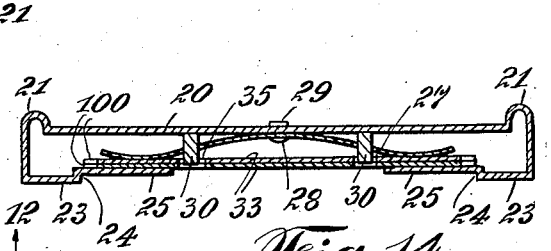
Figure 14 is a section through the line 14—14 of Figure 11.
Figure 12:
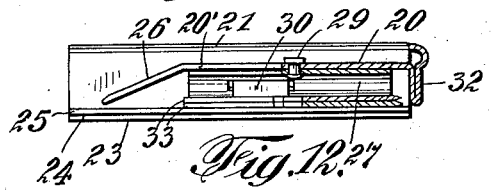
Figure 12 is a section through the line 12—12 of Figure 11.
Figure 13:
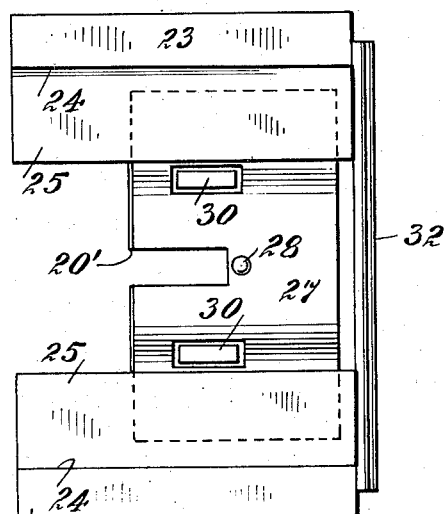
Figure 13 is a bottom view of the device of Figure 11 with the blades removed.

As Figures 7, 8 and 9 are taken along the line 7—7 of Figure 6, it is to be understood that both sides of the razor have mechanism similar to that illustrated and described.

This razor comprises the handle 50, the guard 51 and the cap 52 with suitable mechanism, not shown, for raising the cap 52 from the guard 51 and lowering it into abutment with a blade 33 positioned upon the guard 51.

The guard 51 carries in its center axis a member 53 pivoted at 54, and a member 55, having the hooked end 56, pivoted at 57. On each side of the guard is a trip element 58 of the member 53 extending above the guard and is normally retained in that position by a spring 59.

In its center axis of the guard is a member 60 which is pivotally attached to the guard 51 at 61. A member 62 having the hook extremity 63 is pivotally attached to the guard 51 at 64. A trip 65 on each side of the guard is carried by member 60, the end 63 of the member 62 being normally above the guard 51 and thus retained by the spring 66.

The illustrations show my described blade ejector magazine during its passage between the guard 51 and the cap 52.

Prior to the introduction of my device, the blade 33 is removably attached to the guard 51 by means of the hooks 56, 56 positioned over the end portion of the blade, and the hook 63 extending through the recess 34 of the blade and over and upon the blade 33. In this position the blade 33 can not be moved longitudinally or vertically to release it from the guard without a depression of the trips 58, 58 and 65, 65.

A consideration of Figures 7, 8 and 9 illustrating several steps of action of my device, will clearly show the means whereby my device will introduce a new blade and withdraw the used blade by its simple insertion and withdrawal.

It will be noted that in Figure 6 the used blade 33' has been flexed and is starting to climb the element 26 of the device top. In Figure 7, the device has moved the trip 65 downwardly and the used blade 33' has moved further over the element 26 and in Figure 8 with my device fully inserted within the razor, the blade 33' has been released from the guard and is positioned upon top 20 with the withdrawing lug 29 positioned through the recess 34 and at its closed end.

The new blade 33, which is the lowest one in the magazine is now positioned in proper place upon the guard, and is maintained in contact against the bottom member 25, 25 of the magazine by the spring 27, and while it is in this position it is below the extremities of the lugs 30, 30 and is removably attached to the guard by the lugs 112, 112 of the guard, while the remaining blades are retained within the magazine by the lugs 30, 30.

During the withdrawal of my magazine from the position shown in Figure 9, the upwardly extended lugs 112, 112 carried by the guard prevent the blade from outer movement, while the lug 29 of the magazine carries the used blade 33' outwardly.

It is evident that means other than the lugs 29, 29 can be employed to removably retain the blade upon the top member.

When the magazine has been fully withdrawn the new blade 33 is removably attached to the guard in shaving position, while the used blade is withdrawn upon the top of the magazine.

It will be noted that during the movement of my magazine over the guard, the shoulders 24, 24 abut upon the shoulders 67, 67 of the guard 51, thus insuring that the blade will be positioned for proper deposit upon the guard, and that the walls of the magazine will not contact the edges of the thus positioned blade during the withdrawal of the magazine.

It is evident that a magazine of my invention may be employed for the withdrawal of a used blade and the insertion of a new blade upon a properly constructed razor irrespective of the removably attaching means shown in the drawings, and it is also evident that blades of different constructions may be employed, depending upon such changes in the construction of the magazine and razor as will enable it to operate therewith.

In Figures 1 to 10, I illustrate a blade ejector magazine of my invention as applied to a form of razor adapted for the employment of double edge blades, and in Figures 11 to 20 I illustrate its application to a form of razor in which single edge blades are employed.

The magazine shown in Figures 11 to 14 is similar to that shown in Figures 1 to 4, except that the elements are so positioned that the blades are ejected from the longer side of the magazine rather than from the shorter side as in Figures 1 to 4, this being necessary in order to adapt the magazine for the shown and described form of a razor adapted for the use of single edged blades, and the same numerals are employed as in Figures 1 to 4.

Figure 15:
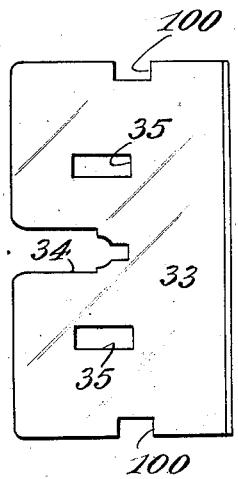
Figure 15 is a top plan view of a blade adapted for use with the device of Figure 11.

The one-edged blade shown in Figure 15 is similar to that shown in Figure 5, except that the recesses 34, 35, 35 are positioned parallel to the short side of the blade instead of parallel to the long side as shown in Figure 5, and it carries the two recesses 100, 100 for purposes described later.

As Figures 17, 18 and 19 are taken along the line 17—17 of Figure 16, it is to be understood that both sides of the razor have mechanism similar to that illustrated and described.

The razor comprises the handle 101, the guard 102 and the cap 103 with suitable mechanism, not shown, for raising the cap 103 from the guard 102 and lowering it into an abutment with a blade 33 (Figure 15) positioned upon the guard 102.

Upon each side of the guard 102 there is a member 104 pivotally attached thereto at 104'. Each member 104 carries a trip 105 which is normally extended through the recess 106 and above teeth of the guard by a spring 107. A blade retaining member 108 is pivotally attached to each side of the guard 102 at 109, the lower end abutting upon the end of the trip 104, and the upper hooked end 110 extending through the recess 111 of the guard and through a recess 100 of a blade 33, the hook end 110 resting upon the upper face of the blade 33.

The blade 33 when positioned upon the guard 102, is retained in position thereon by the two hooked members 110, 110, and two projecting lugs 112, 112 of the guard, each of which passes through an opening 35 of the blade, the blade being positioned within undercuts of said lugs 112, 112. The blade is thus attached to the guard.

In Figures 16 and 17 I show the position of my magazine and the illustrated razor, when the magazine has been introduced into the razor with the extensions 26, 26 below the blade 33' positioned upon the guard.

It will be noticed that the blade 33, which I now refer to as 33' as it is to be withdrawn to distinguish it from a blade 33 to be introduced, has been fixed and has commenced to ride up the inclined members 26, 26, while the blade is still attached to the guard.

In Figure 18, the magazine has been further advanced into the razor, has moved the trips 105, 105 downwardly, thus releasing the members 108, 108 from contact with the members 104, 104, thus allowing them to be free for pivotal movement at 109, 109, thus releasing the hooks 110, 110 from retaining contacts with the blade 33', which has moved upwardly over the upper faces of the inclined members 26, 26.

In Figure 19, I show my magazine fully inserted within the razor, the blade 33' having been fully released from the guard and being fully positioned upon the top 20, the lug 29 being positioned within the recess 34 of the blade and that, therefore, the withdrawal of the magazine will carry the used blade 33' with it.

It will also be noted that in Figure 19, the stacked blades 33, 33 are properly positioned upon the guard and the spring 27 of the magazine will force the lower blade into position with the lugs 112, 112 of the guard extending through the openings 35, 35 of the blade.

The withdrawal of the magazine will leave a new blade upon the guard and will withdraw the used blade, the withdrawal of the magazine causing movements of the members 108, 108 to pass the hook members 110, 110 through the recesses 100, 100 of the blade and to removably affix it thereto.

It will be noted from the above that the blade ejector magazine of my invention is adapted for operation with both single edge blades and double edge blades, whereby a movement of the magazine with respect to a razor will remove a used blade from contact with the guard upon which it has been positioned and will position a new blade upon the guard, and that a reverse movement of the magazine and razor with respect to each other will withdraw the used blade and removably attach the new blade to the guard.

I do not limit myself to the particular size, shape, number or arrangement of parts as shown and described, as they are given solely for the purpose of clearly describing my invention.

What I claim is:

1. A blade ejector magazine comprising a top member having an elongated recess therein; two side members; two bottom members spaced from each other; means carried by said device adapted to removably retain a blade positioned upon said top member; downwardly extended lugs carried by the top member adapted to extend through openings in blades deposited thereon, said lugs reaching to within the thickness of a blade to the inner face of the bottom members; and resilient means adapted to press the lower member of a stack of blades contained therein against the bottom members, the interior width of said magazine being greater than the width of blades inserted therein.

2. A blade ejector magazine comprising a top member having an elongated recess therein, the two legs of said recess being inclined downwardly; two side members; two bottom members spaced from each other; means carried by said device adapted to removably retain a blade positioned upon said top member; downwardly extended lugs carried by the top member adapted to extend through openings in blades deposited thereon, said lugs reaching to within the thickness of a blade to the inner face of the bottom members, and resilient means adapted to press the lower member of a stack of blades contained therein against the bottom members, the interior width of said magazine being greater than the width of blades inserted therein.

3. A blade ejector magazine comprising a top member having an elongated recess therein; two side members; two bottom members spaced from each other, each formed to produce a longitudinal shoulder; means carried by said device adapted to removably retain a blade positioned upon said top member; downwardly extended lugs carried by the top member adapted to extend through openings in blades deposited thereon, said lugs reaching to within the thickness of a blade to the inner face of the bottom members, and resilient means adapted to press the lower member of a stack of blades contained therein against the bottom members, the interior width of said magazine being greater than the width of blades inserted therein.

4. A blade ejector magazine comprising a top member having an elongated recess therein, the two legs of said recess being inclined downwardly; two side members; two bottom members spaced from each other, each formed to produce a longitudinal shoulder; means carried by said device adapted to removably retain a blade positioned upon said top member; downwardly extended lugs carried by the top member adapted to extend through openings in blades deposited thereon, said lugs reaching to within the thickness of a blade to the inner face of the bottom members, and resilient means adapted to press the lower member of a stack of blades contained therein against the bottom members, the interior width of said magazine being greater than the width of blades inserted therein.

5. A blade ejector magazine comprising a top member having an elongated recess therein; two side members; two bottom members spaced from each other; means carried by the top member adapted to extend through an opening in a blade deposited thereon; downwardly extended lugs carried by the top member adapted to extend through openings in blades deposited thereon, said lugs reaching to within the thickness of a blade to the inner face of the bottom members, and resilient means adapted to press the lower member of a stack of blades contained therein against the bottom members, the interior width of said magazine being greater than the width of blades inserted therein.

6. A blade ejector magazine comprising a top member having an elongated recess therein, the two legs of said recess being inclined downwardly; two side members; two bottom members spaced from each other; means carried by the top member adapted to extend through an opening in a blade deposited thereon; downwardly extended lugs carried by the top member adapted to extend through openings in blades deposited thereon, said lugs reaching to within the thickness of a blade to the inner face of the bottom members, and resilient means adapted to press the lower member of a stack of blades contained therein against the bottom members, the interior width of said magazine being greater than the width of blades inserted therein.

7. A blade ejector magazine comprising a top member having an elongated recess therein; two side members; two bottom members spaced from each other, each formed to produce a longitudinal shoulder; means carried by the top member adapted to extend through an opening in a blade deposited thereon; downwardly extended lugs carried by the top member adapted to extend through openings in blades deposited thereon, said lugs reaching to within the thickness of a blade to the inner face of the bottom members, and resilient means adapted to press the lower member of a stack of blades contained therein against the bottom members, the interior width of said magazine being greater than the width of blades inserted therein.

8. A blade ejector magazine comprising a top member having an elongated recess therein, the two legs of said recess being inclined downwardly; two side members; two bottom members spaced from each other, each formed to produce a longitudinal shoulder; means carried by the top member adapted to extend through an opening in a blade deposited thereon; downwardly extended lugs carried by the top member adapted to extend through openings in blades deposited thereon, said lugs reaching to within the thickness of a blade to the inner face of the bottom members, and resilient means adapted to press the lower member of a stack of blades contained therein against the bottom members, the interior width of said magazine being greater than the width of blades inserted therein.

9. A blade ejector magazine comprising a top member having an elongated recess therein; two side members; two bottom members spaced from each other; an upwardly extended lug carried by the top member adapted to extend through an opening in a blade deposited thereon; downwardly extended lugs carried by the top member adapted to extend through openings in blades deposited thereon, said lugs reaching to within the thickness of a blade to the inner face of the bottom members, and resilient means adapted to press the lower member of a stack of blades contained therein against the bottom members, the interior width of said magazine being greater than the width of blades inserted therein.

10. A blade ejector magazine comprising a top member having an elongated recess therein; the two legs of said recess being inclined downwardly; two side members; two bottom members spaced from each other; an upwardly extended lug carried by the top member adapted to extend through an opening in a blade deposited thereon; downwardly extended lugs carried by the top member adapted to extend through openings in blades deposited thereon, said lugs reaching to within the thickness of a blade to the inner face of the bottom members, and resilient means adapted to press the lower member of a stack of blades contained therein against the bottom members, the interior width of said magazine being greater than the width of blades inserted therein.

11. A blade ejector magazine comprising a top member having an elongated recess therein; two side members; two bottom members spaced from each other; each formed to produce a longitudinal shoulder; an upwardly extended lug carried by the top member adapted to extend through an opening in a blade deposited thereon; downwardly extended lugs carried by the top member adapted to extend through openings in blades deposited thereon, said lugs reaching to within the thickness of a blade to the inner face of the bottom members, and resilient means adapted to press the lower member of a stack of blades contained therein against the bottom members, the interior width of said magazine being greater than the width of blades inserted therein.

12. A blade ejector magazine comprising a top member having an elongated recess therein; the two legs of said recess being inclined downwardly; two side members; two bottom members spaced from each other, each formed to produce a longitudinal shoulder; an upwardly extended lug carried by the top member adapted to extend through an opening in a blade deposited thereon; downwardly extended lugs carried by the top member adapted to extend through openings in blades deposited thereon, said lugs reaching to within the thickness of a blade to the inner face of the bottom members, and resilient means adapted to press the lower member of a stack of blades contained therein against the bottom members, the interior width of said magazine being greater than the width of blades inserted therein.

SIDNEY H. BENJAMIN.